United States Patent [19]

Giangarra et al.

[11] Patent Number: 5,611,068

[45] Date of Patent: Mar. 11, 1997

[54] APPARATUS AND METHOD FOR CONTROLLING PIPELINED DATA TRANSFER SCHEME BETWEEN STAGES EMPLOYING SHIFT REGISTER AND ASSOCIATED ADDRESSING MECHANISM

[75] Inventors: Philip B. Giangarra, Mansfield, Mass.; Earl F. Carlow, Scottsdale, Ariz.

[73] Assignee: Motorola, Inc., Schaumburg, Ill.

[21] Appl. No.: 364,889

[22] Filed: Dec. 27, 1994

[51] Int. Cl.[6] ........................................... G06F 12/02
[52] U.S. Cl. ..................... 395/436; 395/496; 395/401; 395/492
[58] Field of Search ............................ 395/467, 496, 395/436, 437, 492, 375, 401

[56] References Cited

U.S. PATENT DOCUMENTS

| | | | |
|---|---|---|---|
| 3,755,784 | 8/1973 | Greek, Jr. et al. | 395/775 |
| 4,052,704 | 10/1977 | Franaszek | 395/436 |
| 4,513,400 | 4/1985 | Masaki | 365/240 |
| 4,905,143 | 2/1990 | Takahashi et al. | 395/800 |
| 5,201,054 | 4/1993 | Dudhela | 395/800 |
| 5,530,890 | 6/1996 | Moore et al. | 395/800 |

*Primary Examiner*—Matthew M. Kim
*Attorney, Agent, or Firm*—Michael K. Lindsey; Bruce E. Stuckman

[57] ABSTRACT

A controller for transferring data between operational stages in a computer is provided. The controller includes a shift register for receiving a scheduling word and a counter for generating an address which corresponds to a datum to be transferred. The controller can be pre-programmed with a scheduling word to effect execution overlap between the stages.

14 Claims, 2 Drawing Sheets

APPARATUS AND METHOD FOR CONTROLLING PIPELINED DATA TRANSFER SCHEME BETWEEN STAGES EMPLOYING SHIFT REGISTER AND ASSOCIATED ADDRESSING MECHANISM

RELATED INVENTIONS

The present invention is related to the following invention which is assigned to the same assignee as the present invention:

"Neural Network and Method of Using Same", having U.S. Pat. No. 5,5517,667.

The subject matter of the above-identified related invention is hereby incorporated by reference into the disclosure of this invention.

TECHNICAL FIELD

The present invention relates generally to computers and, in particular, to a device for controlling overlapped operations in a computer.

BACKGROUND OF THE INVENTION

In a computer, a number of different organizational techniques may be used for increasing execution speed. One technique is execution overlap. Execution overlap is based on the notion of operating a computer like an assembly line with an unending series of operations in various stages of completion. Execution overlap allows these operations to be overlapped and executed simultaneously.

One commonly used form of execution overlap is pipelining. In a computer, pipelining is an implementation technique which allows a sequence of the same operations to be performed on different arguments. Computation to be done for a specific instruction is broken into smaller pieces, i.e., operations, each of which takes a fraction of the time needed to complete the entire instruction. Each of these pieces is called a pipe stage, or simply a stage. The stages are connected in a sequence to form a pipeline in which of the instruction enter at one end, are processed through the stages, and exit at the other end.

Although pipelining may increase the throughput of certain instructions of the computer, it does have limitations. For example, one drawback of pipelining is that the operation performed by each stage is unvarying, and thus, pipelining does not typically allow execution overlap for all operations performed by the computer. This decreases the overall throughput of the computer. Another limitation of pipelining is that each stage typically performs only one operation.

Achieving execution overlap in a computer where one of the stages performs a variety of concurrent operations is a particularly difficult problem. In such a situation it is typically necessary to schedule the operations to avoid over-committing computing resources in a subsequent stage. One technique which is taught by the prior art is the use of semaphores. Essentially, a semaphore is a flag which indicates whether a subsequent stage is ready to receive data. By ascertaining the condition of the flag, a preceding stage can transmit results from its concurrent operations in a fashion which allows some execution overlap between the stages. However, the use of semaphores requires relatively complex communication protocols between stages.

Another solution to scheduling is to simply let the all of the concurrent operations finish before transferring data to the subsequent stage. This approach provides a very simple mechanism for effecting data transfers between stages. However, it does not allow the operations of various stages to overlap, and thus, it severely reduces the overall throughput of the computer.

In summary, there is a need for a mechanism in a computer which will allow execution overlap to the greatest extent possible, regardless of whether there are a plurality of concurrent operations in a particular stage. The mechanism should also be simple and inexpensive to implement.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

It is an advantage of the present invention to provide a controller and method which effect the transfer of data between stages in a computer so that the operations between subsequent stages may overlap.

It is also an advantage of the present invention to provide a controller which is relatively simple and inexpensive to implement.

In a computing device having an architecture which includes a first and second stage, one embodiment of the present invention provides a method for transferring a datum between the first and second stage. Within the method, a scheduling word is received, from which a plurality of addresses are determinable. Next, an address is determined from the scheduling word, wherein the address corresponds to the datum. Finally, the datum is transferred from the first stage to the second stage by providing the address to the first stage.

There is also provided by a preferred embodiment of the present invention a controller. The controller comprises two elements. The first element is a shift register for storing a scheduling word. The scheduling word has a plurality of bits and sequentially provides each of the bits as an output thereof. The second element is a counter for generating an address. The counter increments the address in response to the output of the shift register.

Figure 1:
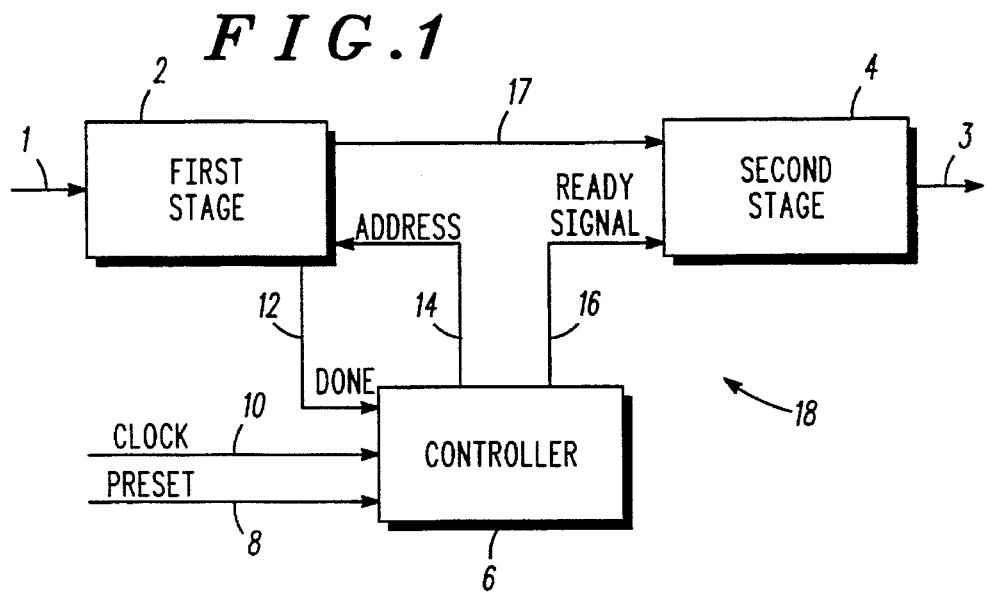
FIG. 1 shows a block diagram of a computer which incorporates a controller conforming to an embodiment of the present invention.

FIG. 1 shows a block diagram of a computer 18 which incorporates a controller 6 conforming to an embodiment of the present invention. The computer 18 includes first stage 2, second stage 4, and controller 6. The first stage 6 receives a plurality of inputs on input bus 1 and performs operations using the inputs, such as data processing or arithmetic calculations. Results from these operations are provided to the second stage 4 using a data bus 17. The second stage 4 performs operations which may use the results from the first stage 2. These results may include both data and control information.

During the course of a computation cycle, the first stage 2 generates a plurality of results from a predetermined set of operations. Generally, each result is generated at a different time within the computation cycle; however, results may also be generated simultaneously. In any case, the amount of time needed by each operation to produce a result is known before the commencement of the computation cycle. The computation cycle is defined by the period time required to complete the predetermined set of operations. Within the first stage 2, operations may occur concurrently or sequentially, or in any combination thereof.

In addition to generating results which are provided to the second stage 4, the first stage 2 provides a done signal 12 to the controller 6. The done signal 12 indicates that the first stage 2 has completed all of the operations of a corresponding computation cycle. The done signal 12 may affect the values of either the ready signal 16 or the addresses generated by controller 6. For example, the done signal 12 may cause the controller 6 to generate a burst of addresses and continuously assert the ready signal 16.

The controller 6 controls the flow of results between the first stage 2 and the second stage 4 in a manner that allows execution overlap between the stages whenever it is possible. Essentially, the controller 6 provides a sequence of addresses, over time, via bus 14 to the first stage 2. Shortly after receiving an address, the first stage 2 places a corresponding result on the data bus 17. Since the amount of time required by the first stage 2 to produce each result is known beforehand, the controller 6 can be pre-programmed to provide the addresses in an order that allows execution overlap between the first and second stages. For example, the controller 6 can be pre-programmed to provide the addresses according to the order in which the corresponding results are generated by the first stage 2. The controller 6 also provides a ready signal 16 to alert the second stage 4 that a result from the first stage 2 is ready to be transferred over the data bus 17.

As shown, the controller 6 is also responsive to a clock signal 10 and a preset signal 8. The clock signal 10 is used to synchronize internal functions within the controller 6. Also, the clock signal 10 could be used to synchronized the ready signal 16 with each address provided over the bus 14. The preset signal 8 allows the controller to be set to a known state which produces a known address on the bus 14. For example, the preset signal 8 could be used at the beginning of a computation cycle to force the controller 6 to provide the first of the sequence of addresses corresponding to the cycle.

In one embodiment of the present invention, the computer 18 implements a polynomial expansion of which the general form is represented by Equation 1 as follows:

$$y = \sum_{i=1}^{m} w_{i-1} x_1^{g_{1i}} x_2^{g_{2i}} \ldots x_n^{g_{ni}} \qquad \text{Equation (1)}$$

where $x_i$ represent the inputs received on input bus 1 and can be a function such as $x_i = f_i(z_j)$, where $z_j$ is any arbitrary variable, and where the indices i, j, and m may be any integers; where y represents the output 3 of the computer 18; where $w_{i-1}$ represent the coefficient for the ith term; where $g_{1i}, \ldots, g_{ni}$ represent the exponents for the ith term and are integers; and n is the number of inputs. In this embodiment, the operations involved in computing the terms are performed by the first stage 2 and the summation of the terms is performed by the second stage 4.

Figure 2:
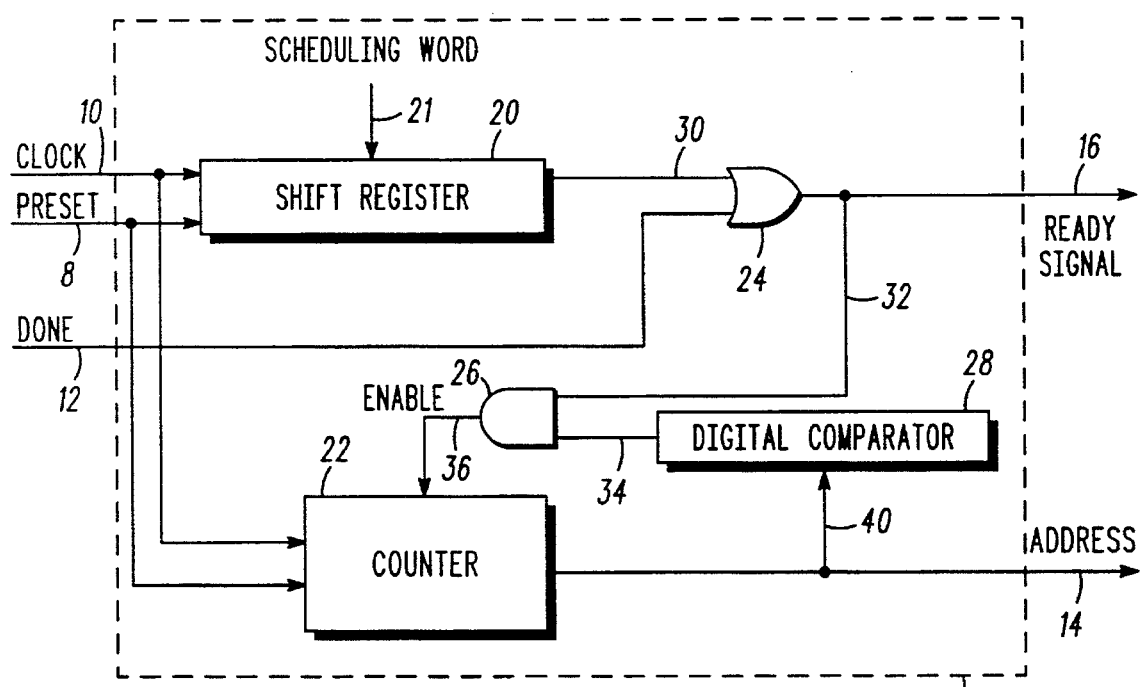
FIG. 2 shows a block diagram of a preferred embodiment of the present invention.

FIG. 2 shows a block diagram of the controller 6 in accordance with a preferred embodiment of the present invention. The controller 6 includes a shift register 20, counter 22, or-gate 24, and-gate 26, and digital comparator 28. The details of the operation of controller 6 are given below.

Prior to the start of a computation cycle, the preset signal 8 is received by the shift register 20 and counter 2. The preset signal 8 causes the contents and output of the counter 22 to be set to a predetermined value. In a preferred embodiment, the predetermined value for the counter is zero. On the other hand, the preset signal 8 causes the shift register 20 to be loaded with a scheduling word which corresponds to the computation cycle.

As shown, the shift register 20 receives the scheduling word across parallel input 21. The scheduling word is a digital word, where each bit of the word may be used to determine whether the counter 22 should be enabled or the ready signal 16 asserted. Although the scheduling word may be of any length, in a preferred embodiment it is 32 bits in length. The shift register 20 provides one of the bits, referred to as a first bit, on input 30 of the or-gate 24.

The operation of the shift register 20 and counter 22 are synchronized with a clock signal 10. In a preferred embodiment, both the shift register 20 and counter 22 are responsive to positive transitions of the clock signal 10. During each cycle of the clock signal 10, the shift register 20 places a successive bit of the scheduling word on input 30 of or-gate 24. In addition to receiving the first bit, or-gate 24 also receives the done signal 12. When either the first bit or done signal 12 is equal to one, the or-gate 24 sets both the ready signal 16 and the and-gate input 32 to one.

The done signal 12 is set to one by the first stage when it has completed all of its operations. The done signal 12 allows the first stage 2 to override the scheduling word. For example, if the scheduling word generates a first bit which is equal to zero, the first stage 2 can still assert the ready signal 16 and enable the counter 22 by setting the done signal 12 to one. The done signal is particular useful is situations where the shift register has completely shifted through a scheduling word and a plurality of results still need to be transferred from the first stage 2 to the second stage 4. This typically happens when a plurality of concurrent operations within the first stage 2 simultaneous complete at the end of a computation cycle. In this case, the done signal 12 can enable the counter 22 to provide an uninterrupted sequence of addresses.

The counter 22 generates a sequence of addresses in response to the clock signal 10 and an enable signal 36. The output of the counter 22, which is an address, is provided on the bus 14 to the first stage 2 and also to the input 40 of the digital comparator 28. In response to a pass signal 34 and input 32, and-gate 26 provides the enable signal 36 to the counter 22. If the enable signal 36 is one, the counter 22 increments the address once during each clock cycle. When the enable signal 36 is zero, the counter 22 holds the address at its current value. Although the address may include any number of bits, the address is five bits in length in a preferred embodiment.

The digital comparator 28 compares the address generated by the counter 22 to determine if it is equal to a maximum address. The maximum address is a digital word which represents the final address to be generated for a computation cycle. When the output of the counter 22 is equal to the maximum address, digital comparator 28 asserts a zero on the pass signal 34, thus disabling the counter and causing it to hold the current address.

In the above description of FIG. 2, the operation of the controller 6 is based on the use of positive logic, that is, a form of logic in which the Boolean value of true equates to one, and the Boolean value of false equates to zero. However, it will be apparent to one of ordinary skill that the controller 6 could be implemented using negative logic, where the value of false equates to one and the value of true equates to zero, or any combination of devices using both positive and negative logic.

In one embodiment of the present invention, the controller 6 is implemented by integrated circuits. However, one of ordinary skill in the art will recognize that a programmable logic array or other digital logic device, such as a microprocessor executing software, could also be used to implement the functions performed by the controller 6.

Figure 3:
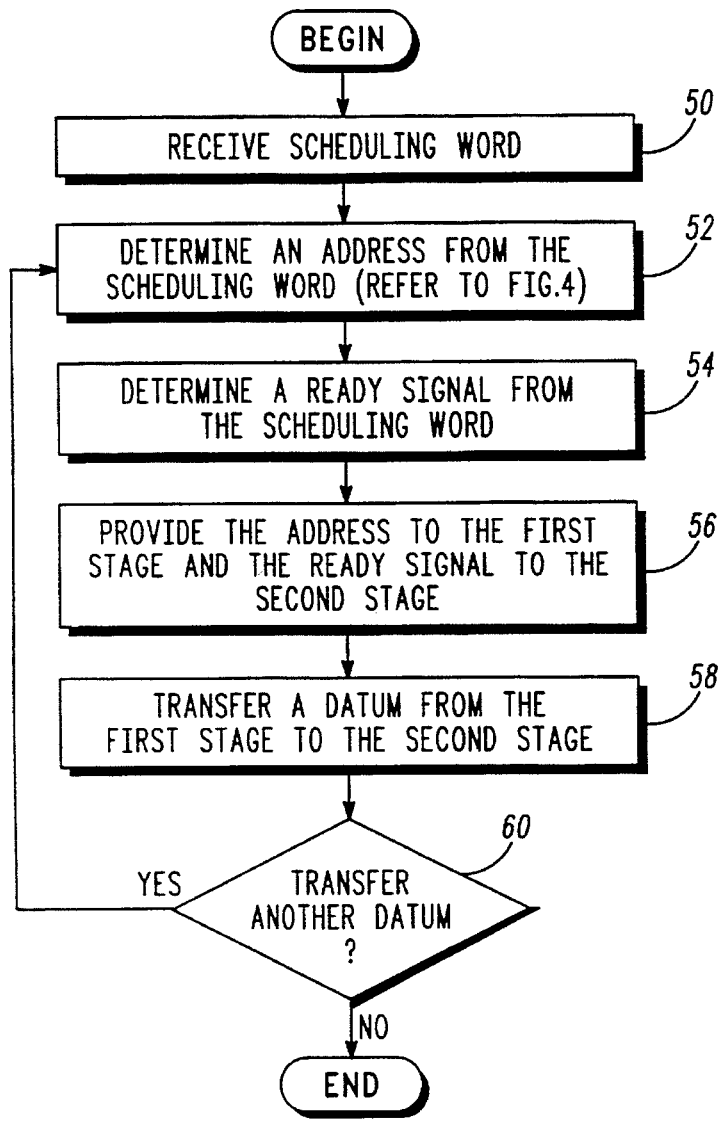
FIG. 3 shows a flow diagram of a method of transferring a datum in accordance with one embodiment of the present invention.

FIG. 3 shows a flow diagram of a method of transferring a datum in accordance with one embodiment of the present invention. The flow diagram illustrates the various steps taken by controller 6 to cause the transfer of data between the first stage 2 and the second stage 4. As shown in box 50, a scheduling word is received by the controller and loaded into shift register 20.

After loading the shift register 20, an address is determined from the scheduling word. Generally, a single bit of the scheduling word is sufficient to ascertain the address. However, bit-slices including more than one bit may be used in determining the address. The details of how the address is determined in a preferred embodiment are given by the flow diagram of FIG. 4. See box 52.

In addition to the address, the ready signal is also determined from the scheduling word. Similar to the address, the ready signal is determinable from one or more bits of the scheduling word. However, in a preferred embodiment, the ready signal depends on the value of the first bit from shift register 20. See box 54.

Next, the address and ready signal are provided to the first and second stages, respectively. See box 56.

Some time after the address is provided to the first stage, a datum corresponding to the address is transferred from the first to the second stage. See box 58.

A check is made by the controller 6 to determine whether another datum is to be transferred. Typically, the controller 6 stops providing addresses shortly after the counter 22 generates an address which is equal to the maximum address value. If there is another datum to be transferred, the method returns to box 52. See decision box 60.

Figure 4:
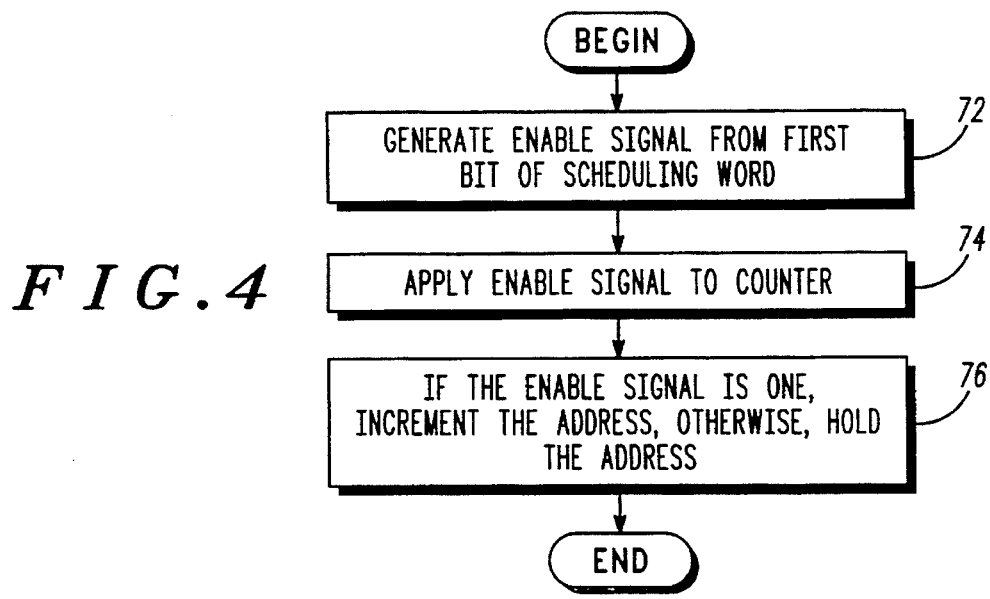
FIG. 4 shows a flow diagram of a method of determining control signals from a scheduling word in accordance with another embodiment of the present invention.

FIG. 4 shows a flow diagram of a method of determining an address from a scheduling word in accordance with another embodiment of the present invention. In box 72, an enable signal is generated from the scheduling word. The enable signal is derived from the first bit of shift register 20. The first bit may be applied to one or more logic gates before producing an enable signal. During the execution of a computation cycle, the scheduling word is shift by one bit during each clock cycle. Consequently, the first bit may assume the value of each bit of the scheduling word at some point during the computation cycle.

In box 74, the enable signal is applied to the counter 22. If the enable signal is one, then the address is incremented. If not, the address is held at its current value. See box 76.

In summary, the present invention provides both a controller and method which allow execution overlap between operations in various stages of a computer. By pre-programming the controller with a scheduling word, data from a preceding stage can be transferred to a subsequent stage before the completion of a computation cycle. One key advantage of the present invention is that the controller is simple and relatively inexpensive to implement.

While specific embodiments of the present invention have been shown and described, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In a computing device having a first stage and a second stage, a method for transferring a datum between the first stage and the second stage, which comprises the following steps:

loading a shift register with a scheduling word, wherein the scheduling word has a plurality of bits, the shift register sequentially providing each of the plurality of bits as a first bit;

generating an enable signal based on the first bit;

applying the enable signal to a counter having an output;

if the enable signal is one, incrementing the output;

providing the output as a datum address;
transferring the datum address to the first stage; and
transferring the datum from the first stage to the second stage in response to transferring the datum address to the first stage.

2. The method of claim 1, further comprising the steps of:

determining a ready signal from the scheduling word; and providing the ready signal to the second stage, wherein the ready signal corresponds to the datum.

3. The method of claim 1, further comprising the step of:

generating a ready signal based on the first bit; and providing the ready signal to the second stage, wherein the ready signal corresponds to the datum.

4. In a computing device having a first stage and a second stage, a controller for controlling a transfer of data between the first stage and the second stage, the controller comprising:

a shift register for storing a scheduling word having a plurality of bits, the shift register sequentially providing each of the plurality of bits as an output thereof;

a counter for generating a sequence of datum addresses in response to the output of the shift register, the counter providing each of the sequence of datum addresses to the first stage, wherein a datum is transferred from the first stage to the second stage in response to each of the sequence of datum addresses; and wherein if the output of the shift register is one, the counter increments a current address and then provides the current address to the first stage as a next in the sequence of datum addresses, otherwise the counter holds the current address.

5. The controller of claim 4, wherein the counter and the shift register are responsive to a clock signal.

6. The controller of claim 4, wherein the output of the shift register is provided as a second output of the controller.

7. The controller of claim 4, wherein the counter and the shift register are responsive to a preset signal.

8. The controller of claim 7, wherein the shift register responds to the preset signal by loading the scheduling word and the counter responds to the preset signal by storing a predetermined value.

9. In a computing device having a first stage and a second stage, an integrated circuit for controlling a transfer of data between the first stage and the second stage, the integrated circuit comprising:

a shift register for storing a scheduling word having a plurality of bits, the shift register sequentially providing each of the plurality of bits as an output thereof;

an or-gate, responsive to the output of the shift register and a first signal from the first stage, for generating a second signal by performing a logical or operation which utilizes the first signal and the output of the shift register;

a counter for generating a sequence of datum addresses in response to the second signal, the counter providing each of the sequence of datum addresses to the first stage, wherein a datum is transferred from the first stage to the second stage in response to each of the sequence of datum addresses;

wherein if the second signal is one, the counter increments a current address having a maximum value, and then provides the current address to the first stage as a next in the sequence of datum addresses, otherwise the counter holds the current address; and comparison means, for determining whether the current address is equal to the maximum value, if so, the comparison means preventing the counter from incrementing the current address.

10. The integrated circuit of claim 9, wherein the counter and the shift register are responsive to a clock signal.

11. The integrated circuit of claim 9, wherein the first stage executes an operation and the first signal indicates that the first stage has completed executing the operation.

12. The integrated circuit of claim 9, wherein the second signal is provided to the second stage.

13. The integrated circuit of claim 9, wherein the counter and the shift register are responsive to a preset signal.

14. The integrated circuit of claim 13, wherein the shift register responds to the preset signal by loading the scheduling word and the counter responds to the preset signal by storing a predetermined value.

\* \* \* \* \*